UNITED STATES PATENT OFFICE 2,681,906

PYRIDIUM PENICILLIN

Alphonse P. Granatek, Syracuse, and Gerard J. Boyle, North Syracuse, N. Y., assignors to Bristol Laboratories, Inc., Syracuse, N. Y., a corporation of New York No Drawing. Application January 25, 1952, Serial No. 268,348

2 Claims. (Cl. 260—156)

The present invention relates to a new amine salt of penicillin, more particularly phenylazo-alpha, alpha-diaminopyridine penicillin, which is capable of exerting a repository antibiotic action and is also useful in therapeutics for oral administration, for external application and for use as a supplement in animal and poultry feeds.

The new penicillin salt of the present invention has the following formula

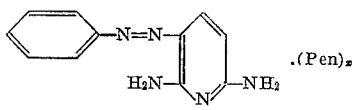

wherein Pen designates an acid penicillin radical or an active moiety thereof, capable of forming an addition salt with phenylazo-alpha, alpha-diaminopyridine, and $x$ designates an integer from one to two inclusive.

The product of the present invention may be obtained by reaction of a salt of penicillin with a salt of phenylazo-alpha, alpha-diaminopyridine, which is also known as Mallophene or Pyridium.

A more comprehensive understanding of this invention is obtained by reference to the following examples.

Example I 2.49 grams of phenylazo-alpha, alpha-diaminopyridine monohydrochloride is dissolved in a minimum amount of water and this solution is added to a concentrated, aqueous solution containing 3.72 grams of potassium penicillin G. The orange-colored phenylazo-alpha, alpha-diaminopyridine salt of penicillin which precipitates and is collected by filtration is found to be a solid exhibiting a potency of 800 units per mgm. and a solubility in water of 840 units per cc.

Example II

Potassium penicillin G (18.6 grams) is shaken with 75 ml. of 8.5% phosphoric acid and 150 ml. of ether in the cold until two clear layers result. The aqueous layer is withdrawn and discarded. The ether solution is filtered and then added all at once to a solution in 50 ml. of ether of phenylazo-alpha, alpha-diaminopyridine free base which has been liberated by alkali from 2.5 grams of phenylazo - alpha,alpha - diamino - pyridine monohydrochloride. The solid, orange-colored phenylazo-alpha,alpha-diaminopyridine penicillin precipitates and is collected by filtration.

While the present invention has been described with particular reference to the phenylazo-alpha,alpha-diaminopyridine salt of penicillin G, it will be understood that the phenylazo-alpha,-alpha-diaminopyridine salts of other penicillins are also included within the scope of this invention. For instance, penicillins such as the penicillins G, F, X, dihydro F, O and K and mixtures of two or more such penicillins, particularly such mixtures containing at least 85% of penicillin G, are included within the scope of this invention.

It will be understood that the reaction can be carried out in organic solvents other than ether. Examples of such solvents are butanol, propanol, amyl acetate, methyl amyl acetate, isopropyl ether, mesityl oxide, and methyl isobutyl ketone.

It will be understood also that the ethereal solution of the free base may be prepared in ether by the use of caustic to liberate the free amine from an organic-solvent soluble or water-soluble salt such as the phosphate, nitrate, hydrobromide, sulfate, citrate, acetate and tartrate. It will be further understood that such salts may be used in place of the hydrochloride of Example I.

We claim:
1. A salt of penicillin and phenylazo-alpha, alpha-diaminopyridine.
2. A salt of penicillin G and phenylazo-alpha, alpha-diaminopyridine.

References Cited in the file of this patent

UNITED STATES PATENTS

| Number | Name | Date |
|---|---|---|
| 2,578,641 | Cooper | Dec. 11, 1951 |

OTHER REFERENCES

Monasch, "Science," vol. 107, Oct. 17, 1947, p. 370.